(12) United States Patent
Engelen et al.

(10) Patent No.: US 9,820,359 B2
(45) Date of Patent: Nov. 14, 2017

(54) METHODS AND APPARATUS FOR CONFIGURATION OF CONTROL DEVICES

(71) Applicant: PHILIPS LIGHTING HOLDING B.V., Eindhoven (NL)

(72) Inventors: Dirk Valentinus René Engelen, Heusden-Zolder (BE); Roel Peter Geert Cuppen, Venlo (NL); Ramon Antoine Wiro Clout, Eindhoven (NL); Dzmitry Viktorovich Aliakseyeu, Eindhoven (NL); Tatiana Aleksandrovna Lashina, Eindhoven (NL); Bartel Marinus Van De Sluis, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 45 days.

(21) Appl. No.: 14/383,680

(22) PCT Filed: Mar. 4, 2013

(86) PCT No.: PCT/IB2013/051712
§ 371 (c)(1),
(2) Date: Sep. 8, 2014

(87) PCT Pub. No.: WO2013/132416
PCT Pub. Date: Sep. 12, 2013

(65) Prior Publication Data
US 2015/0015165 A1  Jan. 15, 2015

Related U.S. Application Data

(60) Provisional application No. 61/608,286, filed on Mar. 8, 2012.

(51) Int. Cl.
*H05B 37/02* (2006.01)
*H04B 10/114* (2013.01)

(52) U.S. Cl.
CPC ..... *H05B 37/0272* (2013.01); *H04B 10/1143* (2013.01); *H05B 37/0254* (2013.01)

(58) Field of Classification Search
CPC ............ H05B 37/0272; H05B 37/0254; H04B 10/1143
(Continued)

(56) References Cited

U.S. PATENT DOCUMENTS 7,550,935 B2    6/2009  Lys et al.
8,872,442 B2 *  10/2014 Fushimi ................ H05B 37/02
                                                    315/149
(Continued)

FOREIGN PATENT DOCUMENTS

CN    1949949 A      4/2007
EP    2945469 A1 *  11/2015  ......... H05B 37/0272
(Continued)

*Primary Examiner* — Dylan White

(57) ABSTRACT

Methods and apparatus for configuration of a physical control panel (120). In some embodiments at least one property (128) of a physical control panel (120) is detected at a mobile device (150); a plurality of events (122, 124, 126) that can be generated by the physical control panel (120) are identified; one or more control actions (154) are associated with one or more of the identified events, at the device (150); and those associations are transmitted (159) to a controller (130).

18 Claims, 6 Drawing Sheets

(58) Field of Classification Search
USPC .......................................................... 315/294
See application file for complete search history.

(56) References Cited

U.S. PATENT DOCUMENTS

| | | | | |
|---|---|---|---|---|
| 8,878,451 B2* | 11/2014 | Lee | ..................... | H04L 41/0806 315/291 |
| 8,909,056 B2* | 12/2014 | Weaver | .............. | H05B 37/0272 362/249.02 |
| 9,386,666 B2* | 7/2016 | Economy | ........... | H05B 37/0272 |
| 2001/0017615 A1 | 8/2001 | Lin et al. | | |
| 2008/0168267 A1 | 7/2008 | Bolen et al. | | |
| 2008/0183316 A1* | 7/2008 | Clayton | ................ | G05B 19/042 700/90 |
| 2009/0239587 A1* | 9/2009 | Negron | ............... | G06F 3/04883 455/566 |
| 2010/0052939 A1* | 3/2010 | Liang | ..................... | G08C 17/02 340/12.22 |
| 2011/0169413 A1* | 7/2011 | Wendt | .................... | H05B 37/02 315/152 |
| 2013/0030589 A1* | 1/2013 | Pessina | .............. | H05B 37/0272 700/295 |
| 2014/0070919 A1* | 3/2014 | Jackson | ................. | G08C 17/02 340/5.61 |
| 2014/0252983 A1* | 9/2014 | Hung | .................... | H05B 37/029 315/292 |
| 2015/0195883 A1* | 7/2015 | Harris | ................ | H05B 33/0845 315/155 |
| 2015/0264784 A1* | 9/2015 | Romano | ............ | H05B 33/0872 315/158 |
| 2016/0021723 A1* | 1/2016 | Huizenga | ........... | H05B 37/0272 315/152 |

FOREIGN PATENT DOCUMENTS

| | | | | |
|---|---|---|---|---|
| JP | 2005158560 A | 6/2005 | | |
| JP | 2007287682 A | 11/2007 | | |
| WO | 2005043484 A1 | 5/2005 | | |
| WO | WO 2005043484 A1 * | 5/2005 | ............. | G08C 19/28 |
| WO | 2006100650 A1 | 9/2006 | | |
| WO | 2008029323 A1 | 3/2008 | | |
| WO | 2008142644 A1 | 11/2008 | | |
| WO | 2008146245 A1 | 12/2008 | | |
| WO | 2010067246 A1 | 6/2010 | | |
| WO | 2010143089 A1 | 12/2010 | | |
| WO | 2011161643 A1 | 12/2011 | | |

* cited by examiner

METHODS AND APPARATUS FOR
CONFIGURATION OF CONTROL DEVICES

CROSS-REFERENCE TO PRIOR
APPLICATIONS

This application is the U.S. National Phase application under 35 U.S.C. §371 of International Application No. PCT/IB13/051712, filed on Mar. 4, 2013, which claims the benefit of U.S. Provisional Patent Application No. 61/608, 286, filed on Mar. 8, 2012. These applications are hereby incorporated by reference herein.

TECHNICAL FIELD

The present invention is directed generally to configuration of control devices. More particularly, various inventive methods and apparatus disclosed herein relate to commissioning and configuration of a physical control device, such as a lighting control panel, utilizing a mobile device.

BACKGROUND

In home automation and lighting control systems, fixedly installed or portable control devices are often utilized to control lighting. For example, control panels containing a one or more on/off switches and/or dimmer slides may be utilized. Also, for example, control panels containing a plurality of lighting scene buttons may be utilized in certain environments (e.g., meeting rooms). Each of the lighting scene buttons may be associated with a specific lighting setting for a certain activity and/or desired ambience. Such control panels, referred to herein as "physical control panels," may be fixedly installed on a wall or other location accessible to users in an environment or may be provided as part of a remote control device or other movable device.

In recent years, remote control of some home automation and lighting control systems has been proposed, utilizing mobile devices, e.g. to control lighting. For example, a user interface of a mobile device may enable a user to turn a lighting fixture on/off and/or to control the dimming level of that lighting fixture. However, existing utilization of a mobile device to directly control lighting may be cumbersome. For example, when multiple lighting fixtures are available in a lighting infrastructure, it may be difficult to identify representations of a control for a particular of those lighting fixtures in lighting control software application and/or it may require multiple user actions to initiate the lighting control software and/or locate the representations of the control for a particular lighting fixture. Moreover, conventional approaches to employ a mobile device for controlling lighting fixtures does not enable association at a mobile device of a lighting action with an event of a physical control panel, such that performance of the event at the control panel causes the associated lighting action to be performed.

Thus, there is a need in the art to utilize a mobile device to associate an desirable action with an event of a physical control panel, so that performance of the event at the control panel causes the associated action to be performed.

SUMMARY

The present disclosure is directed to inventive methods and apparatus for commissioning and configuration of physical control devices, such as lighting control panels. For example, in some embodiments, at least one property of a physical control panel is detected at a mobile device; a plurality of events that can be generated by the physical control panel are identified; one or more control actions are associated with one or more of the identified events, at the mobile device; and those associations are transmitted to a controller.

Generally, in one aspect, a method of configuring a physical lighting control panel utilizing a mobile device user interface is provided and includes the steps of: placing an electronic mobile device within a detection range of a physical lighting control panel; detecting at least one property of the physical lighting control panel at the electronic mobile device; identifying a plurality of events that can be generated by the physical lighting control panel; associating, at the electronic mobile device, a first lighting control action with a first event of the events and a second lighting control action with a second event of the events; and transmitting associations between the first lighting control action and the first event and the second lighting control action and the second event to at least one lighting controller.

In some embodiments, the step of detecting at least one property of the physical lighting control panel at the electronic mobile device includes detecting a radio frequency transmission from the physical lighting control panel.

In some embodiments, the step of detecting at least one property of the physical lighting control panel at the electronic mobile device includes optical processing of a barcode of the physical lighting control panel.

In some embodiments, the first lighting control action is created at the electronic mobile device.

In some embodiments, the method further includes receiving a representation of the physical lighting control panel at the electronic mobile device. In some versions of those embodiments the representation of the physical lighting control panel is transmitted to the electronic mobile device from a configuration database. Optionally, an address of the configuration database is provided in the at least one property of the physical lighting control panel.

In some embodiments, the method further includes displaying a representation of the physical lighting control panel at the electronic mobile device during the step of associating the first lighting control action with the first event.

In some embodiments, the method further includes effectuating the first lighting control action via commands from the lighting controller in response to the first event occurring at the physical lighting control panel. In some versions of those embodiments the method further includes effectuating the first lighting control action via commands from the lighting controller in response to actuation of a representation of the physical lighting control panel at the mobile electronic device.

In some embodiments, the first lighting control action includes generating a first lighting scene with a plurality of first lighting fixtures controlled by the lighting controller. In some versions of those embodiments, the first lighting fixtures include a first lighting fixture generating a first lighting output during the first lighting scene and a second lighting fixture generating a distinct second lighting output during the first lighting scene. In some versions of those embodiments the step of associating the first lighting control action with the first event includes selecting the first lighting fixture and altering light parameter values of the first lighting fixture at the mobile device and selecting the second lighting fixture and altering light parameter values of the second lighting fixture at the mobile device.

In some embodiments, the first event includes actuation of a button of the physical lighting control panel.

In some embodiments, the first event includes actuation of a switch during a first time period and the second event includes actuation of the switch during a second time period, the second time period distinct from the first time period.

In some embodiments, the first event includes a first actuation of a switch and the second event includes a subsequent actuation of the switch.

In some embodiments, the method further includes associating, at the mobile electronic device, a third lighting control action with a first augmented event of the electronic mobile device. The first augmented event is distinct from the events of the lighting control panel and is effectuated at the mobile electronic device and transmitted to the at least one lighting controller to effectuate the third lighting control action.

In some embodiments, the method further includes selecting the physical control panel from a plurality of detected physical control panels in the detection range.

Generally, in another aspect, a system for configuration of a physical control panel is provided. The system includes a lighting controller receiving physical control panel events from the physical control panel and transmitting lighting control commands to effectuate lighting control actions at a plurality of light sources. Which of the lighting control commands is transmitted by the lighting controller is at least selectively based in part on which of the physical control panel events is received by the lighting controller. The system also includes an electronic mobile device. The electronic mobile device detects at least one property of the physical lighting control panel, identifies the physical control panel events based on the at least one property, associates at least one of the physical control panel events with at least one of the lighting control actions, and communicates associations of the physical control panel events and the lighting control actions to the lighting controller.

In some embodiments, the system further includes at least one configuration database in communication with the electronic mobile device. In some versions of those embodiments, the electronic mobile device receives the control panel events from the configuration database based on providing at least a part of the at least one property to the configuration database. In some implementations, the mobile device is in communication with the configuration database via the lighting controller. In some implementations, the mobile device is directly in communication with the configuration database.

In some embodiments, the electronic mobile device includes a camera reading at least one symbol on the physical control panel to detect the at least one property.

Generally, in another aspect, a method of configuring a physical control panel utilizing a mobile device user interface is provided and includes the steps of: placing an electronic mobile device within a detection range of a physical control panel; detecting at least one property of the physical control panel at the electronic mobile device; identifying a plurality of events that can be generated by the physical control panel; associating, at the electronic mobile device, a first control action with a first event of the events and a second control action with a second event of the events; displaying a representation of the physical control panel at the electronic mobile device during the step of associating the first control action with the first event and the second control action with the second event; and transmitting associations between the first control action and the first event and the second control action and the second event to at least one controller.

In some embodiments, the method further includes receiving the representation of the physical control panel at the electronic mobile device.

In some embodiments, the first event is tied to a first structure in the representation of the physical control panel, the first control action is graphically represented at the electronic mobile device, and the step of associating the first control action wish the first event includes graphically associating the first control action and the first structure at the electronic mobile device.

As used herein for purposes of the present disclosure, the term "LED" should be understood to include any electroluminescent diode or other type of carrier injection/junction-based system that is capable of generating radiation in response to an electric signal. The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, and high-intensity discharge sources (e.g., sodium vapor, mercury vapor, and metal halide lamps).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

The term "controller" is used herein generally to describe various apparatus relating to the operation of one or more light sources. A controller can be implemented in numerous ways (e.g., such as with h dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. Furthermore, it should be readily appreciated that various networks of devices as discussed herein may employ one or more wireless, wire/cable, and/or fiber optic links to facilitate information transport throughout the network.

The term "user interface" as used herein refers to an interface between a human user and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "mobile device" as used herein refers to a mobile computing device that includes a controller and user interface that enables communication between the mobile device and a human user. Mobile devices include devices such as, for example, smart phones, tablet computers, hand held game consoles, and personal digital assistants (PDAs).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
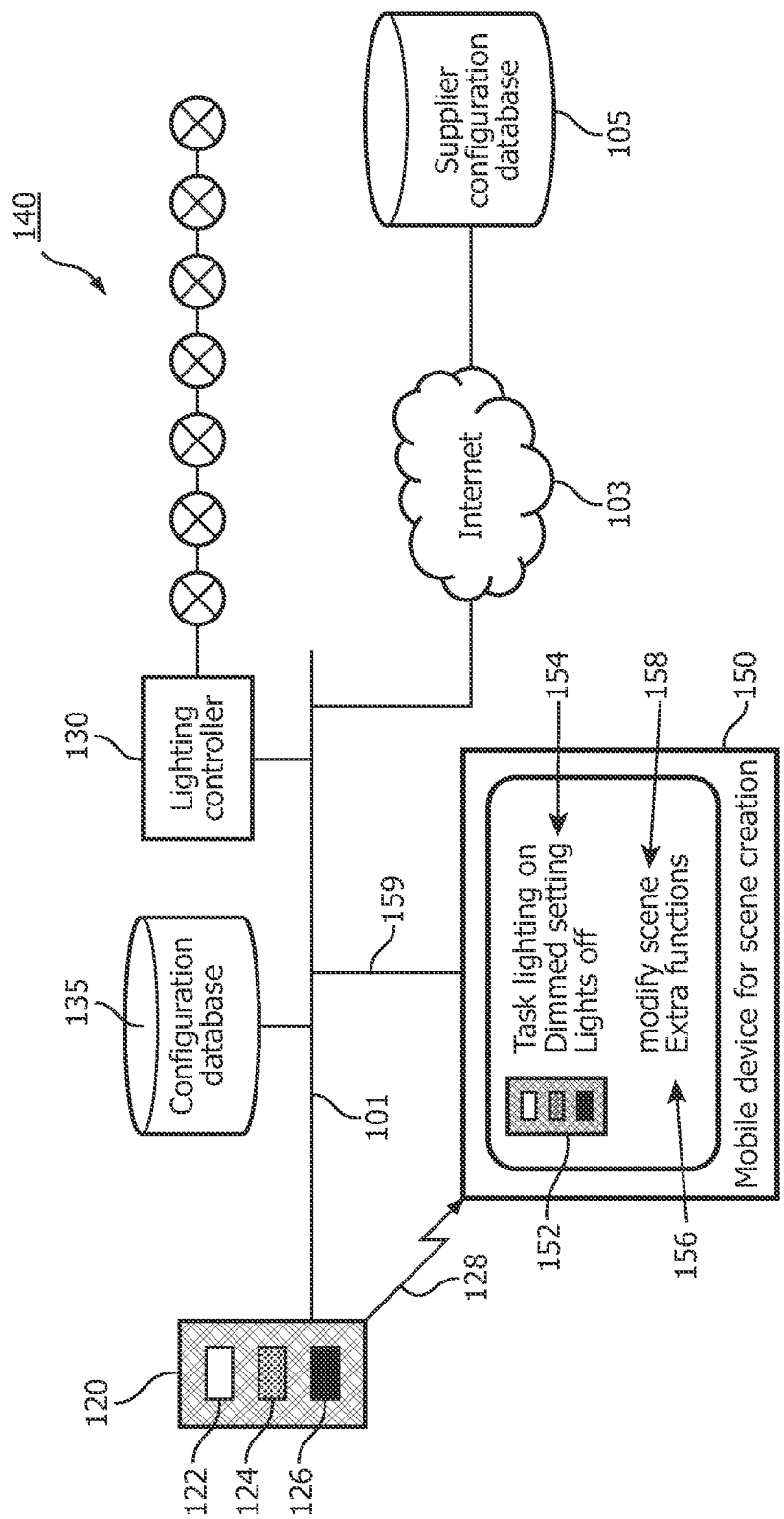
FIG. 1 illustrates a mobile device, a first embodiment of a lighting network, and a supplier configuration database.

In home automation and lighting control systems, physical control panels are often utilized to control lighting. Some home automation and lighting control systems may also utilize a mobile device to control lighting. However, existing utilization of a mobile device to directly control lighting may be cumbersome. For example, it may be difficult to identify representations of a control for a particular of those lighting fixtures in lighting control software and/or it may require multiple user act ions to initiate the lighting control software and/or locate the representations of the control for a particular lighting fixture. Moreover, existing utilization of a mobile device to control lighting fixtures does not enable detection of physical control panels utilized to control the lighting fixtures and association of actions with such physical control panels, such that performance of a specific physical event at the control panel executes the associated action. Thus, the Applicants have recognized and appreciated a need in the art to utilize a mobile device to associate a desirable action with a physical event of a physical control panel, so that performance of the physical event at the control panel causes the associated action to be performed.

More generally, Applicants have recognized and appreciated that it would be beneficial to provide various inventive methods and apparatus related to commissioning and configuration of a physical control device, such as a lighting control panel, utilizing a mobile device. In view of the foregoing, various embodiments and implementations of the present invention are directed to configuration of a physical control panel.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the approach disclosed herein are particularly suited for control of a lighting network. Accordingly, for illustrative purposes, the claimed invention is discussed in conjunction with such a lighting network. However, other configurations and applications of this approach are contemplated without deviating from the scope or spirit of the claimed invention. For example, the approach may be implemented in other environmental control settings such as control of household appliances, control of audio or other media, control of blinds, and/or control of indoor climate related devices (heaters, air conditioners, fans, etc.).

Referring initially to FIG. 1, a tablet-type mobile device 150, a first embodiment of a lighting network, and a supplier configuration database are illustrated. The lighting network includes a lighting controller 130 providing lighting control commands to a plurality of lighting fixtures 140. A physical control panel 120 is in communication with the lighting controller 130 via a communication infrastructure 101. The physical control panel 120 includes three buttons: an upper button 122, a middle button 124, and a lower button 126. Although only a single physical control panel 120 is illustrated in FIG. 1, one of ordinary skill in the art, having had the benefit of the present disclosure, will recognize and appreciate that additional physical control panels may be provided and may be in communication with lighting controller 130 or other controller of the lighting network. Such additional physical control panels may control one or more of lighting fixtures 140 and may have a similar configuration as physical control panel 120 and/or may have other configurations (e.g., containing on/off switches, dimmer slides, rotary dimmers, touch sensitive switches, different buttons, and/or a touch screen).

Actuation of any one of the buttons 122, 124, and 126 generates an event that is transmitted over the communication infrastructure 101 to the lighting controller 130. For example, actuation of the upper button 122 generates a first event signal, actuation of the middle button 124 generates a second event signal, and actuation of the lower button generates a third event signal. The events are received at the lighting controller 130 via communication infrastructure 101 and translated by the lighting controller 130 into one or more commands that are transmitted to the lighting fixtures 140 to effectuate a desired action. For example, actuation of the upper button 122 may generate a first event signal that is translated by the lighting controller 130 into one or more commands that are transmitted to one or more of the lighting fixtures 140 to either turn certain task lighting on (if the task lighting was off) or turn certain task lighting off (if the task lighting was on). Also, for example, actuation of the middle button 124 may generate a second event signal that is translated by the lighting controller 130 into one or more commands that are transmitted to one or more of the lighting fixtures 140 to achieve a desired dimmed setting from those lighting fixtures 140. Also, for example, actuation of the lower button 126 may generate a third event signal that is translated by the lighting controller 130 into one or more commands that are transmitted to one or more of the lighting fixtures 140 to turn one or more of the lighting fixtures 140 off.

The lighting controller 130 is also in communication with a local configuration database 135 via communication infrastructure 101. The local configuration database 135 contains data pertaining to one or more aspects of the present physical infrastructure of the lighting network. For example, the configuration database may contain data pertaining to physical control panels (e.g., data related to a representation of the physical control panels, data related to the event generating capabilities of the physical control panels, data related to the actions currently associated with the events of the physical control panels), sensors (e.g., types, capabilities, locations), lighting controllers (e.g., types, capabilities, current settings), and/or lighting fixtures (e.g., types, capabilities, current settings, locations) that are attached to the lighting network. The local configuration database 135 may optionally be in communication with one or more supplier configuration databases 105 via communication infrastructure 101 and the internet 103 or other network to obtain data for one or more components of the lighting network. Alternatively, the supplier configuration databases 105 may retain certain data for one or more components of the lighting network without providing such data to the local configuration database 135 and may supplement or replace the local configuration database 135. Although the lighting controller 130 and local configuration database 135 are illustrated as separate components in FIG. 1, one of ordinary skill in the art, having had the benefit of the present disclosure, will recognize and appreciate that in some embodiments the lighting controller 130 and the local configuration database 135 may be a single component (e.g., a package including a controller and associated memory).

The communication infrastructure 101 may include one or more wired and/or wireless communication mediums and one or more communications protocols. For example, the communication mediums may include any physical medium, including, for example, twisted pair coaxial cables, fiber optics, or a wireless link using, for example, infrared, microwave, or encoded visible light transmissions and any suitable transmitters, receivers or transceivers to effectuate communication in the lighting fixture network. Also, for example, the communications protocols may include any suitable protocol for data transmission, including, for example, TCP/IP, variations of Ethernet, Universal Serial Bus, Bluetooth, FireWire, Zigbee, DMX, Dali, 802.11b, 802.11a, 802.11g, token ring, a token bus, serial bus, power line networking over mains or low voltage power lines, and/or any other suitable wireless or wired protocol.

The mobile device 150 is illustrated in proximity to the physical control panel 120 and within detection range detecting physical control panel properties 128 of the physical control panel 120. The physical control panel properties 128 uniquely identify the physical control panel 120 in the lighting network. For example, the physical control panel properties 128 may include one or more of supplier information, device type identification, and/or an address within the lighting network. The physical control panel properties 128 may, in some embodiments, be contained in a tag that may be read by the mobile device 150 utilizing a radio-frequency (RF) receiver when the mobile device is in sufficient proximity to the physical control panel 120. For example, near field communication (NFC) or radio-frequency identification (RFID) standards may be utilized by the mobile device 150 to read a tag of the physical control panel 120. In other embodiments the physical control panel properties 128 may alternatively or additionally be transmitted via RF by the physical control panel 120. For example, the Bluetooth standard may be utilized to transmit the physical control panel properties 128. In other embodiments the physical control panel properties 128 may alternatively or additionally be detected by reading or more barcodes affixed to or in close proximity the physical control panel 120 utilizing image processing capabilities of the mobile device 150. For example, Quick Response (QR) barcodes, Semacode barcodes, High Capacity Color Barcodes, Shot Code barcodes, Aztec barcodes, matrix barcodes, and/or other barcodes (e.g., proprietary barcodes) having an optical machine-readable representation of data may be utilized. In other embodiments the physical control panel properties 128 may alternatively or additionally be detected by analyzing one or more unique physical appearance properties of the physical control panel 120 utilizing image processing capabilities of the mobile device 150. For example, the physical control panel 120 may include one or more unique button panels, one or more unique icons, and/or a unique shape that may be uniquely identified by the mobile device 150 utilizing image processing capabilities of the mobile device 150.

Based on determined physical control panel properties 128, the mobile device 150 obtains a representation of the physical control panel 152 from the configuration database 135 via mobile device communication link 159 and communication infrastructure 101. The mobile device 150 may also obtain a listing of events that may be generated by the physical control panel 120, a listing of any actions 154 that are currently associated with the events that may be generated by the physical control panel 120, and/or a listing of other available actions 156 that may additionally or alternatively be associated with one or more of the events that may be generated by the physical control panel 120. The configuration database 135 may optionally obtain the physical representation and/or one or more of the listings from the supplier configuration database 105. In some embodiments the mobile device 150 may alternatively communicate directly with the supplier configuration database 105 via mobile device communication link 159, communication infrastructure 101, and the internet 103 to obtain the physical representation and/or one or more of the listings. In some embodiments the mobile device 150 may alternatively communicate directly with the physical control panel 120 to obtain the physical representation and/or one or more of the listings. In some embodiments the mobile device 150 may generate one or more of the other available actions 156 that may additionally or alternatively be associated with one or more of the events that may be generated by the physical control panel 120.

As illustrated in FIG. 1, the associated actions 154 are provided near the representation of the physical control panel 152 and illustrate that the initial event generated by actuation of the upper button 122 accomplishes the action of turning certain task lighting on, the initial event generated by actuation of the middle button 124 accomplishes the action of generating a dimmed setting with certain lighting fixtures, and the initial event generated by actuation of the lower button 126 accomplishes the action of turning off certain lighting fixtures. Upon selection of the other available functions 156 on the mobile device 150 (e.g., utilizing a touchscreen of the mobile device 150), a screen such as that illustrated in FIG. 2 may be presented.

Figure 2:
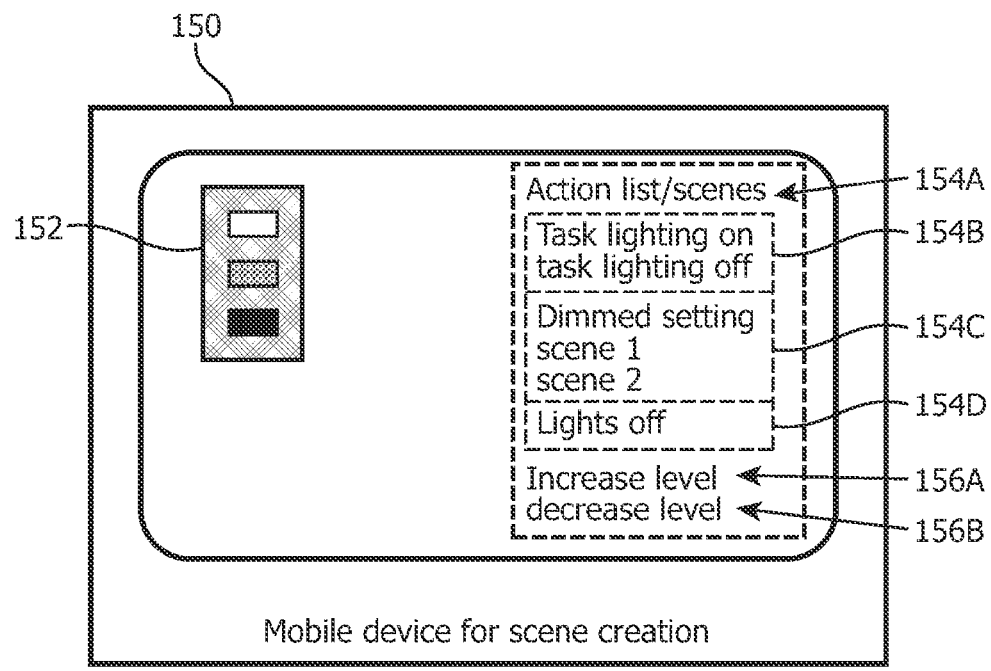
FIG. 2 illustrates a screen of the mobile device of FIG. 1 showing a representation of the physical control panel, a listing of actions that are associated with events on the representation of the physical control panel, and a listing of actions that may be associated with events on the representation of the physical control panel.

FIG. 2 illustrates a screen of the mobile device 150 showing a representation of the physical control panel 152, a listing of actions 154A, 154B, 154C that are associated with events on the representation of the physical control panel 152, and a listing of actions 156A, 156B that may be associated with events on the representation of the physical control panel 152. Actions 154A illustrate act ions that are performed in response to the event generated by actuation of the upper button 122. Certain task lighting is turned on in response to an initial actuation of the upper button 122 and certain task lighting is turned off in response to the succeeding actuation of the upper button 122. Actions 154B illustrate actions that are performed in response to the event generated by actuation of the middle button 124. A dimmed setting of certain lighting fixtures is generated in response to an initial actuation of the middle button 124, a first scene setting is generated in response to the second actuation of the middle button 124, and a second scene setting is generated in response to a third actuation of the middle button 124. Action 154C illustrates the action that is performed in response to the event generated by actuation of the lower button 126. Certain lighting fixtures are turned off (if they are on) in response to actuation of the lower button 126.

Two additional available actions 156A (Increase Light Level) and 156B (Decrease Light Level) are also illustrated. A user may associate one or both of those available actions 156A, 156B to one or more events of the representation of the physical lighting control 152 utilizing the mobile device 150. For example, a user may replace both actions 154A with available action 156A so that when the upper button 122 is actuated, the lighting level is increased when possible. Also, for example, a user may additionally or alternatively replace all three actions 154B with available action 156B so that when the middle button 124 is actuated, the lighting level is decreased when possible. In some embodiments a user may click (e.g., a finger point on a touch screen) and drag an action 156A, 156B to a desired button on the representation of the physical control panel 152 to associate that action with the event generated by the button. An action associated with a desired button may optionally be the only action associated with that button. For example, with certain actions and/or buttons it may be desirable to only associate a single action to an event generated by that button (e.g., lights off, increase light level, and/or decrease light level). An action associated with a desired button may optionally be provided along with other actions associated with that button. For example, with certain actions and/or buttons it may be desirable to associate multiple act ions to an event generated by that button (e.g., lights on/off, multiple lighting scenes, and/or multiple dimming levels). Also, for example, in some embodiments multiple actions may be associated with an event and which action is selected may be based on a particular schedule (e.g., during morning hours an event generated by a dimmer control may effectuate a color temperature adjustment action whereas during evening hours the same event generated by the dimmer control may effectuate a brightness adjustment action). Also, for example, in some embodiments multiple actions may be associated with an event and which action is selected may be based on a queued sequence of events (e.g., flipping a switch a first time turns on the light, flipping the switch the second time selects a particular ambiance, and flipping the switch the third time switches the light off).

Although buttons are illustrated in FIGS. 1 and 2, one of ordinary skill in the art, having had the benefit of the present disclosure, will recognize and appreciate that other physical control panels having alternative and/or additional control structure may be provided. For example, physical control panels having a dimmer may be provided. A mobile device may be utilized as discussed herein to define an appropriate action for one or more events generated by the dimmer (e.g., associate whether actuation of the dimmer dims the light while maintaining color temperature or dims the light while changing the color temperature).

Although only two additional available actions 156A, 156B are illustrated, one of ordinary skill in the art, having had the benefit of the present disclosure will recognize that additional and/or alternative available actions may be provided depending on, inter alia, the configuration of the physical control panel 120, the capabilities of the lighting controller 130, and/or the configuration and capabilities of the lighting fixtures 140. For example, modify scene 158 (FIG. 1) may be selected by a user to add and/or configure one or more lighting scene actions that may be associated with one or more events of the representation of the physical lighting control 152 utilizing the mobile device 150. For example, a user may create a new lighting scene action at mobile device 150 based on data obtained from configuration database 135 and/or generated at mobile device 150. Also, for example, a user may download an existing lighting scene action from supplier configuration database 105. The user may then associate any configured and/or added lighting scene actions with one or more events of the representation of the physical lighting control 152 utilizing the mobile device 150.

As discussed herein, possible lighting actions may be supplied by configuration database 135, supplied by configuration database 105, and/or created on the mobile device 150. For example, actions may be created on the mobile device 150 utilizing light scene creation software. For example, for a set of lighting fixtures 140 in the lighting network, some control values may be defined (e.g., dimming value, color point, RGB value, a value for every DMX position that the set of lighting fixtures uses). Such defined values may vary in time or may be derived from other content (e.g., taking samples from a picture or video). The light scene creation software may be effect based and the desired effect on the environment specified and translated into values for implementation by the lighting controller 130. A desired action in an effect based lighting control system may result in a modification of the desired target light effect and start a recalculation of the control values implemented by the lighting controller 130. Some actions may optionally be considered as relative to the lighting control or effect value. For example, a relative action may be to "increase the value by 10%." To effectuate such an action a lighting control value of 100 will increase to 110 and/or an illuminance target of 500 lux will increase to 550 lux.

A user may also utilize mobile device 150 to alter the association of actions 154A, 154B, 154C that are currently associated with events on the representation of the physical control panel 152. For example, the order of actions 154B may be rearranged by clicking on one of the actions 154B and moving that action up or down in the hierarchy of actions 154B. Also, for example, actions 154A may be associated with the middle button 124 and the actions 154B may be associated with the upper button 122. For example, all of the actions 154B may be selected and dragged to the representation of the upper button 122 to associate those actions 154B with the upper button 122 and all of the actions 154A may be selected and dragged to the representation of the middle button 124 to associate those actions 154A with the middle button 124. One of ordinary skill in the art, having had the benefit of the present disclosure, will recognize and appreciate that additional and/or alternative user interface methodologies may be utilized to associate actions with specific structure and/or specific events of the physical control panel 120. In many embodiments some representation of the available events of the physical control panel 120 and some representation of actions that may be associated with those events will both be displayed on the mobile device 150, along with an indication of which events are associated with which actions.

After associations between actions and events of the physical control panel 120 are made at the mobile device 150, the mobile device 150 transmits those associations to the lighting controller 130 via mobile device communication link 159 and communication infrastructure 101. For example, the associations may be transmitted to the configuration database 135 and the lighting controller 130 may access such associations from the configuration database 135. When an event is generated by the physical control panel 120, the event is sent to the lighting controller 130 and translated by the lighting controller 130 into one or more commands that are transmitted to the lighting fixtures 140 to effectuate the action associated with the event by the mobile device 150.

Figure 3:
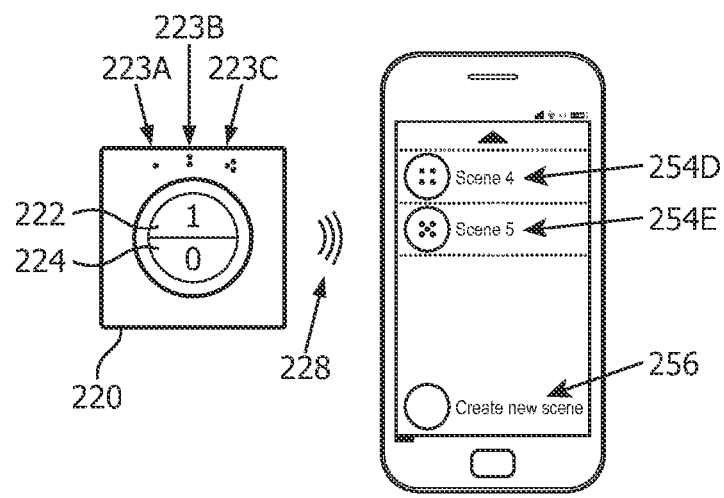
FIG. 3 illustrates another embodiment of a mobile device adjacent another embodiment of a physical control panel.

FIG. 3 illustrates another embodiment of a mobile device 250 adjacent another embodiment of a physical control panel 220. The physical control panel includes a switch having a switch on segment 222 and a switch off segment 224. Actuation of the switch off segment 224 transmits a switch off event that is transmitted by a lighting controller into one or more commands to effectuate turning off one or more lighting fixtures. Each actuation of the switch on segment 222 toggles between a plurality of lighting scenes that are graphically displayed as scene one indicator 223A, scene two indicator 223B, and scene three indicator 223C. In some embodiments each of the indicators 223A-C includes a cut out that is illuminated a first color (e.g., by an LED behind the cutout) when not active and generates a second color (e.g., by a separate LED behind the cutout) when active. Actuation of the switch on segment 222 the first time will cause scene one indicator 223A to be illuminated a certain color and a first scene event to be transmitted to alighting controller and a first lighting scene action to occur. Actuation of the switch on segment 222 the second time will cause scene two indicator 223B to be illuminated a certain color and a second scene event to be transmitted to a lighting controller and a second lighting scene action to occur. Actuation of the switch on segment 222 the third time will raise scene three indicator 223C to be illuminated a certain color and a third scene event to be transmitted to alighting controller and a third lighting scene action to occur. The transmitted scene events may be subsequent transmissions of the same signal or may each be unique signals.

The mobile device 250 is in proximity to the physical control panel 220 and detects physical control panel properties 228 of the physical control panel 220. The physical control panel properties 228 uniquely identify the physical control panel 220 in the lighting network utilizing, for example, one or more of the methods and/or apparatus described herein. Based on determined physical control panel properties 228, the mobile device 250 may obtain representations of portions of the physical control panel from a configuration database or elsewhere (e.g., directly from the physical control panel 220). The mobile device 250 may also obtain a listing of events that may be generated by the physical control panel 220, a listing of any actions that are currently associated with the events, and/or a listing of other available actions that may additionally or alternatively be associated with one or more of the events that may be generated by the physical control panel 220.

In the proximity of the physical control panel 220 (as determined, e.g., via strength of an RF signal and/or a camera), the mobile device 250 might also show a representation of extra buttons 254D and 254E on the screen 256. The extra button 254D is a scene four indicator and the extra button 254E is a scene five indicator. The extra buttons 254D, 254E can be associated with actions for the lighting controller in a similar way as the indicators 223A-C on the physical control panel 220. Actuation of the extra buttons 254D, 254E at the mobile device 250 will cause an event to be generated by the mobile device 250 that is transmitted to the lighting controller to cause the associated lighting scene actions to occur. It may be advantageous to the user of the mobile device 250 if these representations 254D, 254E are shown immediately and by default when the mobile device 250 is held in the proximity of the physical control panel 220. An indication that extra buttons are available on a mobile device may optionally be given at the control panel 220. A user may utilize mobile device 250 to customize the actions that are associated with each of lighting scenes one through three that are accessible via the control panel 220 and with each of lighting scenes four and five that are accessible via the mobile device 250. A user may also create additional lighting scenes and associate such additional scenes with existing or additional events utilizing additional available lighting scenes selection 256. After scene indicators and their associated events are associated with an action at mobile device 250, the mobile device 250 transmits those associations to one or more lighting controller via a mobile device communication link. When an event is generated by the physical control panel 220, the event is sent to the lighting controller and translated by the lighting controller into one or more commands that are transmitted to one or more lighting fixtures to effectuate the action associated with the event.

Figure 4:
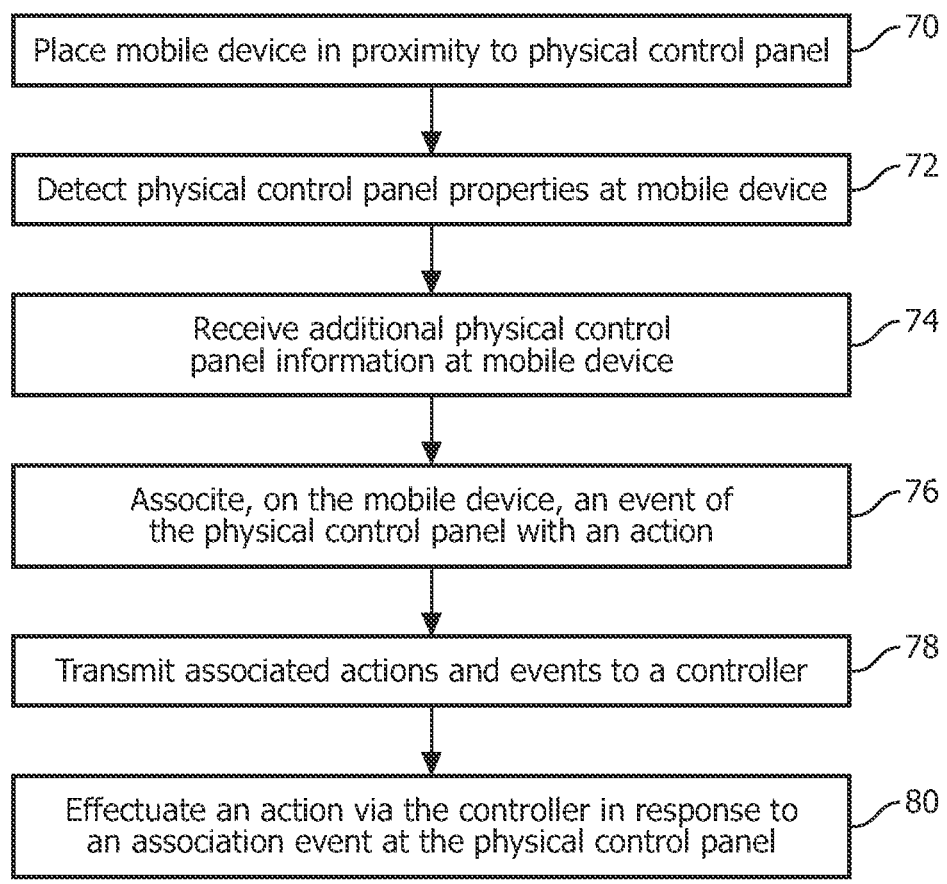
FIG. 4 illustrates an embodiment of a method of configuration of a physical control panel utilizing a mobile device user interface.

FIG. 4 illustrates an embodiment of a method of configuration of a physical control panel utilizing a mobile device user interface. At step 70 a mobile device is placed in proximity to a physical control panel. At step 72 the physical control panel properties are detected at the mobile device. For example, physical control panel properties may be detected utilizing one or more RF and/or optical recognition methodologies discussed herein. At step 74 additional physical control panel properties are received at the mobile device. For example, the representation of the physical control panel may be transmitted to the mobile device from a database. Also, for example, a plurality of events that can be generated by the physical lighting control panel may be received from a database or from the physical lighting control panel directly. At step 76 an event of the physical control panel is associated, on the mobile device, with an action. For example, actions may be supplied by a database and/or created on the mobile device and associated with a supplied listing of events of the physical control panel. At step 78 the associated actions and events may be transmitted to a controller. At step 80 an action is effectuated via the controller in response to an associated event from the physical control panel.

Figure 5:
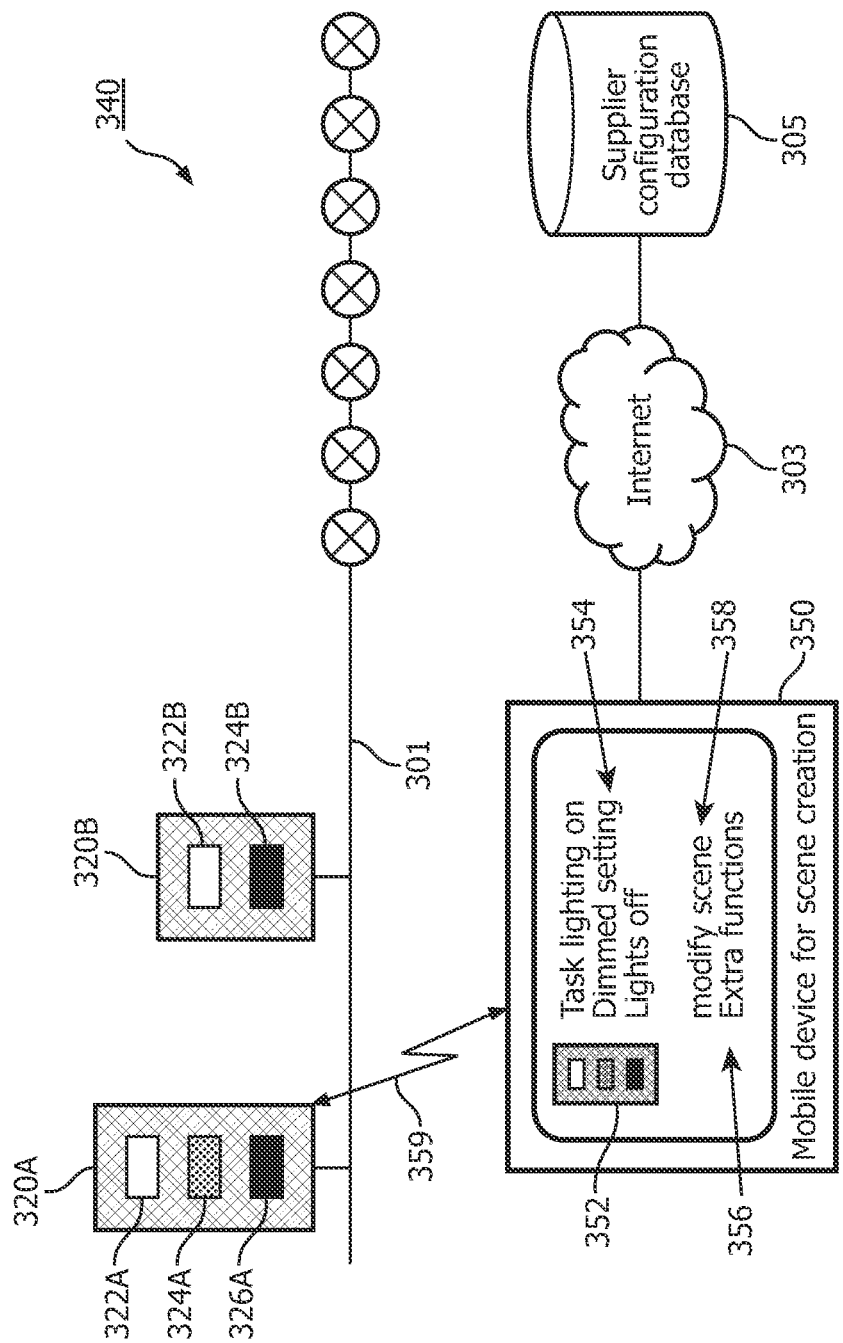
FIG. 5 illustrates a mobile device, a second embodiment of a lighting network, and a supplier configuration database.

FIG. 5 illustrates a tablet-type mobile device 350 and a second embodiment of a lighting network and a supplier configuration database 305. The lighting network includes a first physical control panel 320A and a second physical control panel 320B. Each of the physical control panels includes a local lighting controller providing lighting control commands to a plurality of lighting fixtures 340 via a communication infrastructure 301. The communication infrastructure 301 may include one or more wired and/or wireless communication mediums and one or more communications protocols. The physical control panel 320A includes three physical buttons: an upper button 322A, a middle button 324A, and a lower button 326A. The physical control panel 320B includes two physical buttons: an upper button 322B and a lower button 324B.

The mobile device 350 is illustrated in proximity to the physical control panel 320 and detecting physical control panel properties of the physical control panel 320A via mobile device communications link 359. The physical control panel properties uniquely identify the physical control panel 320A For example, the physical control panel properties may include one or more of supplier information, device type identification, and/or address information within the lighting network. In some embodiments the physical control panel properties may contain information that links to a supplier's website and/or provides an address for a supplier configuration database 305 that corresponds to that physical control panel 320A Utilizing the address, the mobile device 350 may locate and access the supplier configuration database 305 via the internet 303 to obtain additional data pertaining to physical control panel 320A (e.g., data related to a representation of the physical control panel, data related to the event generating capabilities of the physical control panel).

In some embodiments, a barcode of type EAN13 may be provided in combination with the physical control panel 320A to enable the mobile device 350 to optionally detect the physical control panel properties. In some versions of those embodiments the 13 digits of the EAN13 barcode can be structured as follows: 5 digits are used for the supplier identification (e.g., the supplier database address); 3 digits are used for the device type identification (e.g., type and model of physical control panel); and 5 digits are used for the identification of the physical control panel in the environment (e.g., local address for the physical control panel).

Based on determined physical control panel properties, the mobile device 350 obtains a representation of the physical control panel 352 from the supplier configuration database 305 via the internet 303. The mobile device 350 also obtains a listing of events that may be generated by the physical control panel 320A, and optionally a listing of any actions 354 that are currently associated with the events and/or a listing of other available actions 356 that may additionally or alternatively be associated with one or more of the events that may be generated by the physical control panel 320A. In some embodiments one or more of the representation and/or listings may be provided to the mobile device 350 from physical control panel 320A via mobile device communications link 359. The mobile device 350 may have direct access to data related to the configuration of the lighting network and settings for the lighting network can be created on the mobile device 350.

As illustrated in FIG. 5, the associated actions 354 are provided by the representation of the physical control panel 352 and illustrate that the initial event generated by actuation of the upper button 322A accomplishes the action of turning certain task lighting on, the initial event generated by actuation of the middle button 324A accomplishes the action of generating a dimmed setting with certain lighting fixtures, and the initial event generated by actuation of the lower button 326A accomplishes the action of turning off certain lighting fixtures. A user may change the association between the buttons 324A-C and the actions 354 and/or may modify and/or add action associations to the buttons 324A-C via selection of the other available functions 356 and/or modify scene 358 (e.g., in a similar manner as discussed in conjunction with FIGS. 1 and 2).

After associations between actions and events of the physical control panel 320A are made at the mobile device 350, the mobile device 350 transmits those associations to a local lighting controller of the physical control panel 320A. When an event is generated by the physical control panel 320A, commands are directly communicated by the physical control panel 320A to one or more of the lighting fixtures 340 via the communication infrastructure 301 to effectuate the action associated with the event. In some embodiments the communication infrastructure 301 may utilize the DMX communications protocol. The physical control panel 320B may be configured utilizing the mobile device 350 in a similar manner as described with respect to the physical control panel 320A.

As discussed herein, one or more embodiments of the mobile devices may also provide an augmented user interface after association with the physical control panels. For example, when holding a mobile device in the proximity of a physical control panel, extended user interface elements relevant to the environment of the physical control panel may be offered on the mobile device. Such an augmented user interface on the mobile device may enable a user to, inter alia: set/adjust light and/or other parameters (e.g., audio selection, temperature) for the environment/room associated with the physical control panel; access additional lighting scenes which are not available through the physical control panel; and/or download lighting presets from the controller or from another mobile device. A mobile device may communicate with one or more controllers to effectuate such extended user interface elements.

Figure 6:
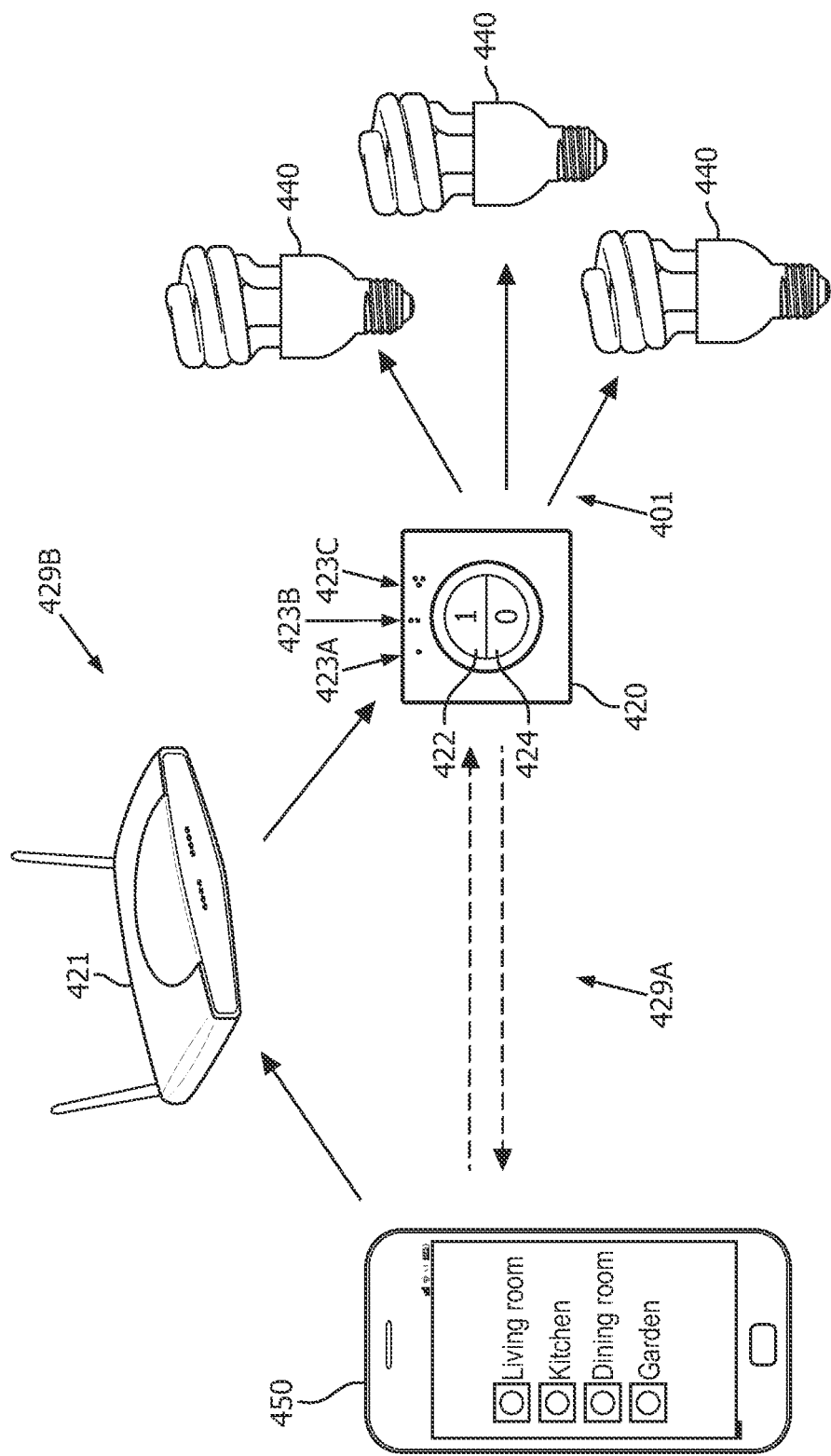
FIG. 6 illustrates a mobile device and a third embodiment of a lighting network.

FIG. 6 illustrates a mobile device 450 and a third embodiment of a lighting network. The lighting network includes a physical control panel 420 that includes a local lighting controller providing lighting control commands to a plurality of lighting fixtures 440 via a communication infrastructure 401. The communication infrastructure 401 may include one or more wired and/or wireless communication mediums and one or more communications protocols. For example, the communication infrastructure 401 may include wireless ZigBee communications. The physical control panel 420 is similar to physical control panel 220 of FIG. 3 and includes a switch on segment 422 and a switch off segment 424. Actuation of the switch off segment 424 generates a switch off event that causes the lighting controller of the physical control panel 420 to effectuate turning off one or more lighting fixtures. Each actuation of the switch on segment 422 toggles between a plurality of lighting scenes that are graphically displayed as scene one indicator 423A, scene two indicator 423B, and scene three indicator 423C. Actuation of the switch on segment 422 the first time will cause scene one indicator 423A to be illuminated, a first scene event to be generated, and the lighting controller of the physical control panel 420 to cause a first lighting scene action to occur. Actuation of the switch on segment 422 the second time will cause scene two indicator 423B to be illuminated, a second scene event to be transmitted to a lighting controller, and the lighting controller of the physical control panel 420 to cause a second lighting scene action to occur. Actuation of the switch on segment 422 the third time will cause scene three indicator 423C to be illuminated, a third scene event to be generated, and the lighting controller of the physical control panel 420 to cause a third lighting scene action to occur. The transmitted scene events may be subsequent transmissions of the same signal or may each be unique signals.

The physical control panel 420 may communicate with the mobile device 450 via direct communications link 429A and/or via indirect communications link 429B. The direct communications link 429A may include, for example, Bluetooth, RFID, and/or NFC. The indirect communications link 429B may include, for example, a standard wireless communication protocol transmitted over a network implemented via router 421. Additional physical control panels may also be in communication with the mobile device 450. For example, additional physical control panels may be in communication with the mobile device 450 via router 421. The physical control panels may make themselves discoverable to the mobile device 450 via router 421, may communicate physical control panel properties to the mobile device 450, may communicate properties of attached light sources to the mobile device 450, and may control attached light sources to create one or more light source actions such as lighting scene actions.

A software application is installed on the mobile device 450 that enables viewing of all physical control panels that are in communication with the mobile device 450. The software application enables a user to choose a desired physical control panel from the plurality of physical control panels and view information concerning its connected light sources. The software application also enables a user to program a lighting scene for the selected one of the physical control panels. The mobile device 450 may detect physical control panel properties of the physical control panel 420 via router 421 that uniquely identify the physical control panel. For example, the physical control panel properties may include one or more of supplier information, device type identification, and/or address information within the lighting network. Based on determined physical control panel properties, the mobile device 450 obtains a listing of events that may be generated by the physical control panel 420, and optionally a listing of any actions that are currently associated with the events and/or a listing of other available actions that may additionally or alternatively be associated with one or more of the events that may be generated by the physical control panel 420. The mobile device 450 may optionally also obtain a representation of the physical control panel 420 from a supplier configuration database or elsewhere (e.g., from the physical control panel 420 directly). After associations between lighting actions and events of the physical control panel 420 are made at the mobile device 450, the mobile device 450 transmits those associations to the lighting controller of the physical control panel 420. When an event is generated by the physical control panel 420, commands are directly communicated by the controller of the physical control panel 420 to one or more of the light sources 440 via the communication infrastructure 401 to effectuate the action associated with the event.

Figure 7:
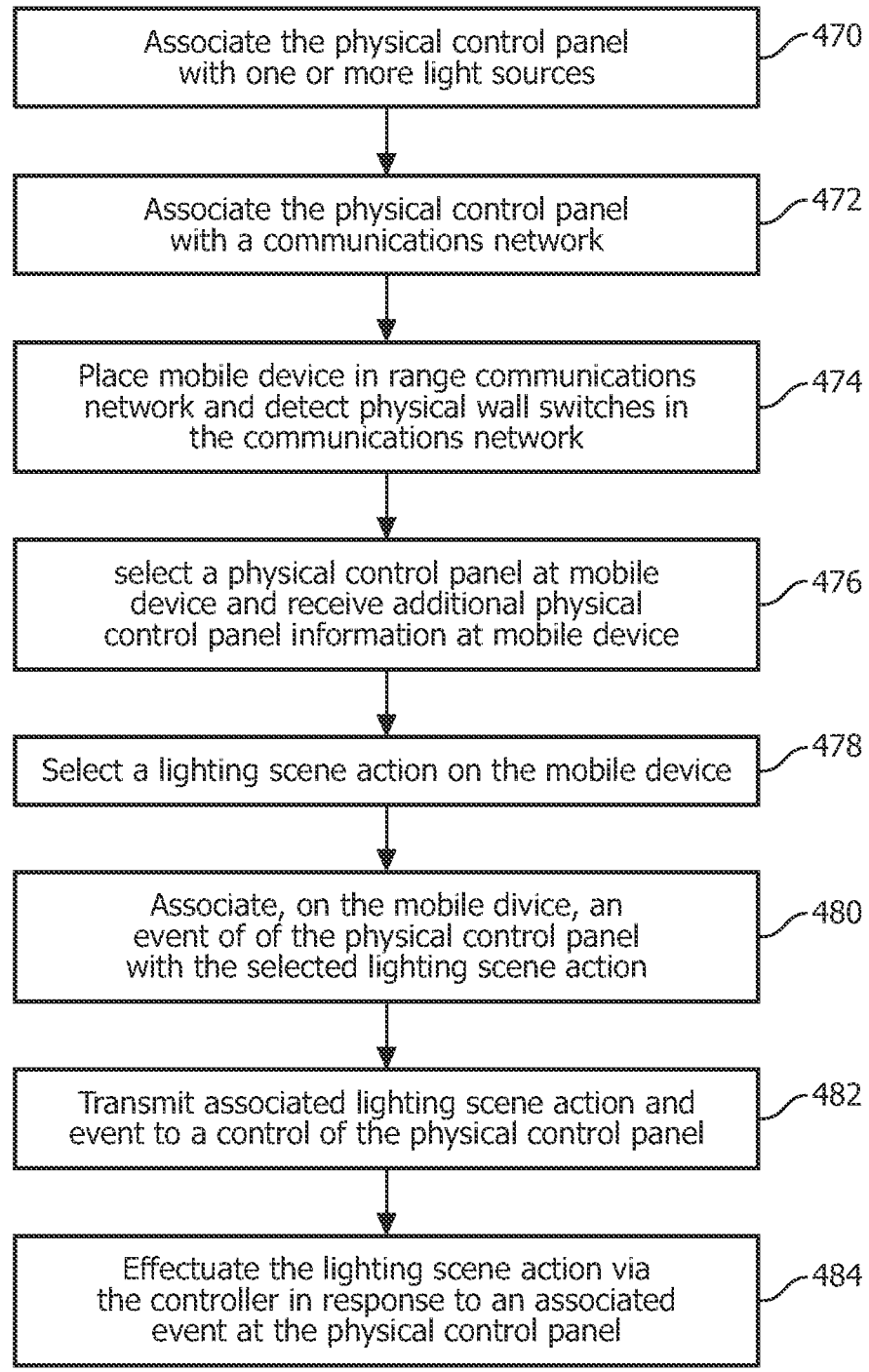
FIG. 7 illustrates another embodiment of a method of configuration of a physical control panel utilizing a mobile device user interface.

FIG. 7 illustrates an embodiment of a method of configuration of the physical control panel 420 utilizing the mobile device 450. At step 470 a user associates the physical control panel 420 with the light sources 440. In some embodiments the association between the physical control panel 420 and the light sources 440 may be accomplished utilizing a commissioning method. For example, in some embodiments the commissioning method may be based on an existing commissioning method called "TouchLink", that utilizes communications between a remote control and ZigBee enabled light sources. By holding the controller associated with the physical control panel 420 close to alight source while pressing a button on the controller for several seconds, the controller and light source will be linked based on the high signal strength of the communication between the controller and light source.

At step 472, a user associates the physical control panel 420 with a communications network such as the indirect communications link 429B provided by router 421. In some embodiments the physical control panel 420 may be associated with a communications network utilizing one or more WiFi commissioning techniques. For example, in some embodiments Wi-Fi Protected Setup (WPS) may be utilized. In some versions of those embodiments, a Push-Button-Method may be utilized in which the user simply has to push a button (either an actual button or virtual button) on both the router 421 and the physical control panel 420. In some other versions of those embodiments, a Near-Held-Communication Method may be utilized in which the user simply has to bring the physical control panel 420 and the router 421 in close proximity to allow a near field communication between the devices.

At step 474, a user places the mobile device 450 within a detection range of the communications link 429B provided by router 421 to enable the mobile device 450 to detect all physical control panels that are in the network. In some embodiments the networked physical control panels are always discoverable by the mobile device 450 (e.g., by broadcasting a discovery message via router 421 at a regular interval). A software application on the mobile device 450 detects the physical control panels in the network (e.g., via detection of the discovery messages transmitted by the physical control panels) and provides a representation of the detected physical control panels to the user. For example, in FIG. 6 the mobile device 450 is displaying the discovered physical control panels "Living Room," "Kitchen," "Dining Room," and "Garden."

At step 476, a user selects one of the detected physical control panels 420 on the mobile device 450. The mobile device 450 sends a selection message to the selected physical control panel 420. In response to the selection message, the selected physical control panel 420 communicates all connected light sources 440, the available light parameters of all connected light sources 440, and current light parameter values to the mobile device 450. The mobile device 450 may graphically display the connected light sources 440 of the physical control panel 420 along with the light parameters of those light sources 440 and/or the current light parameter values.

At step 478, alighting scene action is selected on the mobile device 450 for one or more of the light sources 440 connected to the physical control panel 420. In some embodiments a user selects one of the light sources from the connected light sources 440 of the physical control panel 420 on the mobile device 450. In response, the mobile device 450 provides an interface for the selected light source based on the light parameters of the light source and enables the user to alter the values of the light parameters. The mobile device 450 may send the new action values to the selected light source via the controller of the physical control panel 420. In some embodiments changes to the selected light source on the mobile device 450 are immediately communicated to the light source and made immediately visible to the user. A user may repeat step 478 for different light sources connected to the physical control panel 420 if desired to create a particular lighting scene action. In other embodiments lighting scene actions may be alternatively selected on the mobile device 450 utilizing other methods than individual user adjustment of light sources. For example, in some embodiments image based scene creation may be utilized wherein an image on the mobile device 450 is translated to light parameters of the light sources. Also, for example, in some embodiments one or more lighting scene databases may be consulted to create one or more lighting scene actions.

At step 480, the user associates, on the mobile device 450, an event of the selected physical control panel with the selected lighting scene action. For example, a physical representation of the selected physical control panel 420 may be provided on the mobile device 450 and pressing a pertinent portion of the physical representation of the selected physical control panel 420 on the mobile device 450 longer than a predefined threshold may associate a recently selected lighting scene action with a related event. For example, a physical representation of scene one indicator 423A may be pressed by a user on the mobile device 450 for three seconds or longer to associate a recently selected lighting scene action with the scene one event generated by the switch on segment 422.

At step 482, the mobile device 450 transmits the associated lighting scene actions and events to a controller of the physical control panel 420. The mobile device 450 sends a program request to the controller of the selected physical control panel to store the selected lighting scene action as related to the correct event of the physical control panel 420. In some embodiments the controller of the physical control panel 420 may optionally send a program request to one or more of the light sources 440 to associate their current value with the pertinent event of the selected physical control panel 420. For example, in embodiments where changes to the selected light source on the mobile device 450 during the lighting scene action selection step 478 are immediately communicated to the light source and made immediately visible to the user, the light sources may be directed to associate their current value with the event of the selected physical control panel that is associated with the selected lighting scene action.

At step 484, the lighting scene action is effectuated via the controller in response to an associated event at the physical control panel 420. When an event is generated by the physical control panel 420, commands are directly communicated by the physical control panel 420 to one or more of the associated light sources 440 via the communication infrastructure 401 to effectuate the action associated with the event.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms dearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless dearly indicated to the contrary, in any methods claimed herein that include more than one step or act, the order of the steps or acts of the method is not necessarily limited to the order in which the steps or acts of the method are recited.

Reference numerals appearing in the claims between parentheses are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of configuring a physical lighting control panel, comprising:
    detecting at least one property of said lighting control panel at an electronic mobile device;
    identifying, based on the at least one property, a plurality of events that can be generated by said lighting control panel and transmitted to at least one lighting controller in response to user interaction with the lighting control panel;
    associating, at said electronic mobile device, a first lighting control action with a first event of said events and a second lighting control action with a second event of said events; and
    transmitting associations between said first lighting control action and said first event and said second lighting control action and said second event to said at least one lighting controller to cause said at least one lighting controller to effectuate said first lighting control action in response to said first event of said lighting control panel and to effectuate said second lighting control action in response to said second event of said lighting control panel; wherein the method further comprises:
    receiving a representation of said lighting control panel at said electronic mobile device, wherein said representation of said lighting control panel is transmitted to said electronic mobile device from a configuration database.

2. The method of claim 1, wherein said step of detecting at least one property of said lighting control panel at said electronic mobile device includes detecting a radio frequency transmission from said lighting control panel.

3. The method of claim 1, wherein said step of detecting at least one property of said lighting control panel at said electronic mobile device includes optical processing of a barcode of said lighting control panel.

4. The method of claim 1, wherein said first lighting control action is created at said electronic mobile device.

5. The method of claim 1, wherein said at least one property of said lighting control panel includes an address of said configuration database.

6. The method of claim 1, further comprising displaying a representation of said lighting control panel at said electronic mobile device during said step of associating said first lighting control action with said first event.

7. The method of claim 1, further comprising effectuating said first lighting control action via commands from said at least one lighting controller in response to said first event occurring at said lighting control panel.

8. The method of claim 7, further comprising effectuating said first lighting control action via commands from said lighting controller in response to actuation of a representation of said lighting control panel at said mobile electronic device.

9. The method of claim 1, wherein said first lighting control action includes generating a first lighting scene with a plurality of first lighting fixtures controlled by said lighting controller.

10. The method of claim 9, wherein said first lighting fixtures include a first lighting fixture generating a first lighting output during said first lighting scene and a second lighting fixture generating a second lighting output during said first lighting scene, said first lighting output distinct from said second lighting output.

11. The method of claim 10, wherein said step of associating said first lighting control action with said first event includes selecting said first lighting fixture and altering light parameter values of said first lighting fixture at said mobile device and selecting said second lighting fixture and altering light parameter values of said second lighting fixture at said mobile device.

12. The method of claim 1, wherein said first event includes actuation of a button of said lighting control panel.

13. The method of claim 1, wherein said first event includes actuation of a switch of said lighting control panel during a first time period and said second event includes actuation of said switch during a second time period, said second time period distinct from said first time period.

14. The method of claim 1, wherein said first event includes a first actuation of a switch of said lighting control panel and said second event includes a subsequent actuation of said switch.

15. The method of claim 1, further comprising associating, at said mobile electronic device, a third lighting control action with a first augmented event of said electronic mobile device, wherein said first augmented event is distinct from said events of said lighting control panel and is effectuated at said mobile electronic device and transmitted to said at least one lighting controller to effectuate said third lighting control action.

16. The method of claim 1, further comprising selecting said control panel from a plurality of detected control panels in said detection range.

17. The method of claim 1, wherein the first event is generated by the lighting control panel in response to a first user touch of the lighting control panel and wherein the second event is generated by the lighting control panel in response to a second user touch of the lighting control panel.

18. A method of configuring a physical lighting control panel, comprising:
 detecting at least one property of said lighting control panel at an electronic mobile device;
 identifying, based on the at least one property, a plurality of user touches of the lighting control panel in response to which the lighting control panel transmits commands to at least one lighting controller;
 associating, at said electronic mobile device, a first lighting control action with a first user touch of the plurality of user touches and a second lighting control action with a second user touch of the plurality user touches; and
 transmitting associations between said first lighting control action and said first user touch and between said second lighting control action and said second user touch to said at least one lighting controller to cause said at least one lighting controller to effectuate said first lighting control action in response to said first user touch of said lighting control panel and to effectuate said second lighting control action in response to said second user touch of said lighting control panel;
 wherein the method further comprises:
 receiving a representation of said lighting control panel at said electronic mobile device, wherein said representation of said lighting control panel is transmitted to said electronic mobile device from a configuration database.

* * * * *